United States Patent
Nishioka et al.

(10) Patent No.: US 10,001,504 B2
(45) Date of Patent: Jun. 19, 2018

(54) ACCELERATION DETECTING DEVICE (71) Applicant: Murata Manufacturing Co., Ltd., Nagaokakyo-shi, Kyoto-fu (JP)

(72) Inventors: Eriko Nishioka, Nagaokakyo (JP); Tsuyoshi Futamata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 387 days.

(21) Appl. No.: 14/693,403

(22) Filed: Apr. 22, 2015

(65) Prior Publication Data
US 2015/0226765 A1  Aug. 13, 2015

Related U.S. Application Data (63) Continuation of application No. PCT/JP2013/077919, filed on Oct. 15, 2013.

(30) Foreign Application Priority Data

Oct. 26, 2012  (JP) ................................ 2012-236457

(51) Int. Cl.
G01P 15/09 (2006.01)
G01P 1/02 (2006.01)

(52) U.S. Cl.
CPC .............. G01P 15/09 (2013.01); G01P 1/023 (2013.01)

(58) Field of Classification Search
CPC ............................ G01P 1/023; G01P 15/0922
See application file for complete search history.

(56) References Cited

U.S. PATENT DOCUMENTS

2001/0015103 A1* 8/2001 Tabota ................ G01P 15/0922
73/514.16
2010/0037693 A1    2/2010 Matsuo

FOREIGN PATENT DOCUMENTS

| JP | 04247708 A | * | 9/1992 |
| JP | H04/247708 A | | 9/1992 |
| JP | H09-26433 A | | 1/1997 |
| WO | WO 2008/093680 A1 | | 8/2008 |

OTHER PUBLICATIONS

International Search Report for PCT/JP2013/077949, dated Jan. 14, 2014.
Written Opinion of the International Searching Authority of PCT/JP2013/077919, dated Jan. 14, 2014.

* cited by examiner

Primary Examiner — Peter Macchiarolo
Assistant Examiner — Herbert K Roberts
(74) Attorney, Agent, or Firm — Arent Fox LLP (57) ABSTRACT

There is provided an acceleration detecting device capable of using a flat plate-like packaging substrate having no recess portion as a packaging substrate and reducing the height thereof.
In an acceleration detecting device, an acceleration detecting element is held by first and second holding members therebetween so as to configure a plate-like structure. In the plate-like structure, at least one of a third surface and a fourth surface of the acceleration detecting element is located at the inner side relative to first holding member surfaces or second holding member surfaces of the first and second holding members in the thickness direction connecting the third surface and the fourth surface.

18 Claims, 8 Drawing Sheets

ACCELERATION DETECTING DEVICE

CROSS-REFERENCE TO RELATED APPLICATIONS

The present application is a continuation of PCT/JP2013/077919 filed Oct. 15, 2013, which claims priority to Japanese Patent Application No. 2012-236457, filed Oct. 26, 2012, the entire contents of each of which are incorporated herein by reference.

FIELD OF THE INVENTION

The present invention relates to an acceleration detecting device having a configuration in which an acceleration detecting element is held between first and second holding members.

BACKGROUND OF THE INVENTION

Figure 8:
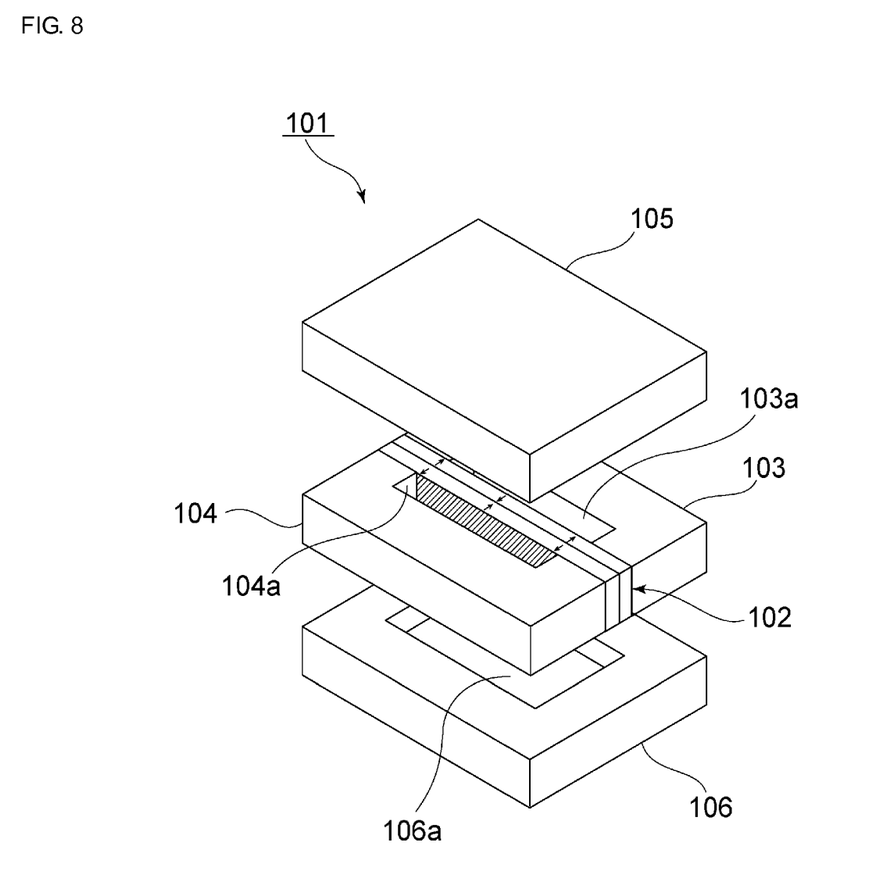
FIG. 8 is an exploded perspective view illustrating an example of an existing acceleration detecting device.

An acceleration detecting device has been widely used for an existing impact detecting device. For example, the following Patent Document 1 discloses an acceleration detecting device including a bimorph-type acceleration detecting element using piezoelectric ceramics. FIG. 8 is an exploded perspective view illustrating the acceleration detecting device of this type. In FIG. 8, a bimorph-type acceleration detecting element 102 has a strip-like shape. In an acceleration detecting device 101, holding members 103 and 104 are bonded to a pair of opposing side surfaces of the acceleration detecting element 102. That is to say, the pair of holding members 103 and 104 having grooves 13a and 14a opening to the side surfaces of the acceleration detecting element 102 hold the acceleration detecting element 102 therebetween. The thickness of the acceleration detecting element 102 is set to be equal to the thicknesses of the pair of holding members 103 and 104. Accordingly, the acceleration detecting element and the pair of holding members configure a plate-like structure. Further, packaging substrates 105 and 106 are laminated on the upper surface and the lower surface of the above-mentioned plate-like structure in order to seal the acceleration detecting element 102. A recess portion 106a is formed on the inner surface of the packaging substrate 106. It should be noted that a recess portion is also formed on the inner surface of the packaging substrate 105. The recess portion 106a is provided to form a space for not inhibiting vibration of the acceleration detecting element 102.

Patent Document 1: Japanese Unexamined Patent Application Publication No. 9-26433

In the existing acceleration detecting device as disclosed in Patent Document 1, the recess portions are required to be formed on the upper and lower packaging substrates 105 and 106. This makes it difficult to make the thicknesses of the packaging substrates 105 and 106 smaller. Accordingly, there is difficulty in reducing the height of the acceleration detecting device 101. In addition, a process of forming the recess portions is required to be executed, resulting in a problem that the cost is increased.

SUMMARY OF THE INVENTION

An object of the present invention is to provide an acceleration detecting device capable of using a flat plate-like packaging substrate having no recess portion and capable of reducing the height thereof.

An acceleration detecting device according to an aspect of the invention includes a strip-like acceleration detecting element and first and second holding members. The strip-like acceleration detecting element includes first and second surfaces opposing each other, third and fourth surfaces connecting the first and second surfaces and extending in a direction orthogonal to the first and second surfaces, and fifth and sixth surfaces orthogonal to the first and second surfaces and the third and fourth surfaces and connecting the first and second surfaces. The first holding member is bonded to the first surface of the acceleration detecting element and has a groove portion opening to the first surface of the acceleration detecting element. In the same manner, the second holding member is bonded to the second surface of the acceleration detecting element and has a groove portion opening to the second surface of the acceleration detecting element. A direction connecting the above-mentioned third and fourth surfaces is a thickness direction. In the aspect of the invention, the first and second holding members include a first holding member surface and a second holding member surface, respectively, that are parallel with the third and fourth surfaces of the acceleration detecting element and oppose each other in the thickness direction connecting the third and fourth surfaces. At least one of the third and fourth surfaces of the acceleration detecting element is located at an inner side relative to the first holding member surface or the second holding member surface of the first and second holding members in the thickness direction.

In a specific aspect of the acceleration detecting device according to the aspect of the invention, it is preferable that both of the third surface and the fourth surface of the acceleration detecting element be located at the inner side relative to the first holding member surface or the second holding member surface of the first and second holding members in the thickness direction.

In another specific aspect of the acceleration detecting device according to the aspect of the invention, it is preferable that a groove portion continuous and flush with a surface of the third surface and the fourth surface of the acceleration detecting element, which is located at the inner side in the thickness direction, and located at the inner side relative to the first holding member surface or the second holding member surface be provided on at least one of the first holding member and the second holding member.

In another specific aspect of the acceleration detecting device according to the aspect of the invention, it is preferable that first and second packaging substrates laminated from a side of the third surface and a side of the fourth surface of the acceleration detecting element of a plate-like structure configured by the first and second holding members and the acceleration detecting element be further provided.

In another specific aspect of the acceleration detecting device according to the aspect of the invention, it is preferable that the first or second packaging substrate be formed by a flat plate-like member having no recess portion on a surface at a side of the acceleration detecting element.

In another specific aspect of the acceleration detecting device according to the aspect of the invention, it is preferable that the acceleration detecting element be supported by the first and second holding members in a cantilever form.

In another specific aspect of the acceleration detecting device according to the aspect of the invention, it is preferable that the acceleration detecting element be supported by the first and second holding members from both sides.

With the acceleration detecting device according to the invention, in a configuration in which the first and second holding members are bonded to the acceleration detecting element, at least one of the third and fourth surfaces of the acceleration detecting element is located at the inner side relative to the first or second holding member surface in the thickness direction. Therefore, when the packaging substrate is laminated from a side of at least one of the third surface and the fourth surface, vibration of the acceleration detecting element is not easily inhibited even if the packaging substrate having no recess portion is used. Accordingly, the acceleration detecting device can be configured using the packaging substrate having no recess portion, thereby reducing the height and the cost.

DETAILED DESCRIPTION OF THE EXEMPLARY EMBODIMENTS

Hereinafter, the present invention will be made obvious by explaining specific embodiments of the invention with reference to the accompanying drawings.

Figure 1:
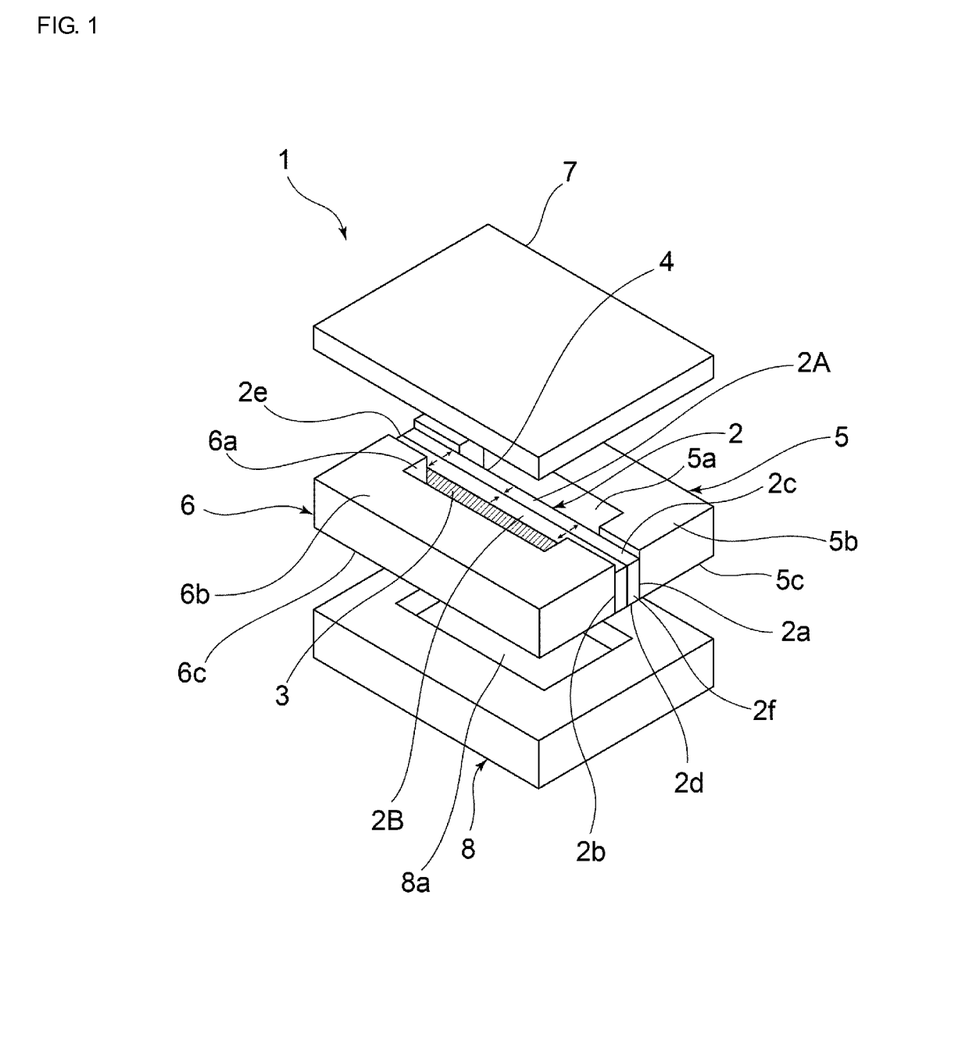
FIG. 1 is an exploded perspective view illustrating an acceleration detecting device according to a first embodiment of the invention.
Figure 2:
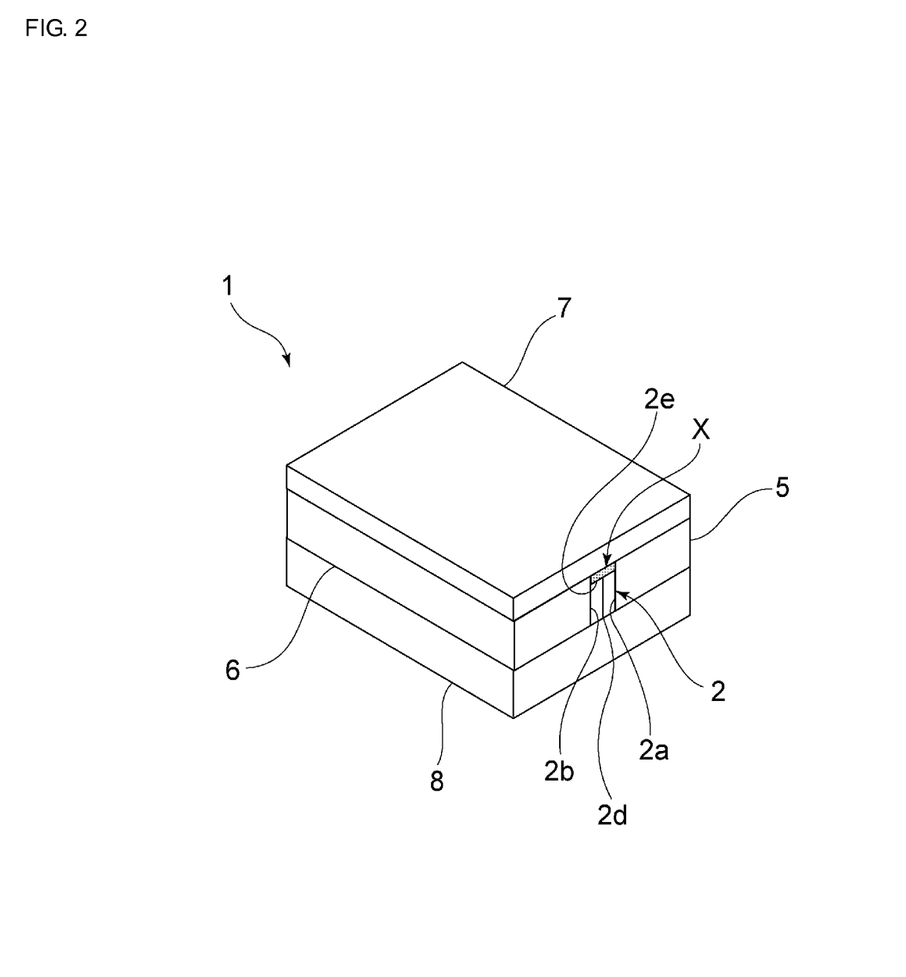
FIG. 2 is a perspective view illustrating outer appearance of the acceleration detecting device according to the first embodiment of the invention.

FIG. 1 is an exploded perspective view illustrating an acceleration detecting device according to a first embodiment of the invention. FIG. 2 is a perspective view illustrating outer appearance thereof.

An acceleration detecting device 1 in the embodiment includes a strip-like acceleration detecting element 2. The acceleration detecting element 2 has a strip-like shape, that is, an elongated rectangular parallelepiped shape. The acceleration detecting element 2 has a first surface 2a and a second surface 2b opposing each other. Further, the acceleration detecting element 2 has a third surface 2c and a fourth surface 2d extending in the direction orthogonal to the first and second surfaces 2a and 2b. Surfaces orthogonal to the first and second surfaces 2a and 2b and the third and fourth surfaces 2c and 2d correspond to fifth and sixth surfaces 2e and 2f. In the embodiment, the fifth and sixth surfaces 2e and 2f oppose each other in the lengthwise direction of the strip-like acceleration detecting element 2. In a state as illustrated in FIG. 1, the upper surface side corresponds to the above-mentioned third surface 2c and the lower surface side corresponds to the fourth surface 2d.

As is not particularly limited, the acceleration detecting element 2 has a configuration in which a first piezoelectric layer 2A and a second piezoelectric layer 2B, which have been subjected to polarization treatment in the directions as indicated by arrows in FIG. 1, are laminated in the embodiment. The first and second piezoelectric layers 2A and 2B can be formed by piezoelectric ceramics like lead titanate zirconate-based (PZT) ceramics. Detection electrodes 3 and 4 are formed on the outer surface of the second piezoelectric layer 2B and the outer surface of the first piezoelectric layer 2A, respectively.

The acceleration detecting element 2 is a bimorph-type acceleration detecting element. It is needless to say that the acceleration detecting element is not limited to have a bimorph-type configuration in the invention. An appropriate well-known acceleration detecting element having a strip-like shape and capable of detecting acceleration that is applied from the outside can be used.

First and second holding members 5 and 6 are bonded from the sides of the first surface 2a and the second surface 2b of the acceleration detecting element 2, respectively. The first holding member 5 has a groove 5a opening to the acceleration detecting element 2 side. The groove 5a is provided to form a space for not inhibiting displacement due to acceleration of the acceleration detecting element 2. Accordingly, the first holding member 5 is bonded to the first surface 2a of the acceleration detecting element 2 at both the sides of the groove 5a in the lengthwise direction of the acceleration detecting element 2.

In the same manner, the second holding member 6 also has a groove 6a opening to the acceleration detecting element 2 side. The second holding member 6 is bonded to the second surface 2b of the acceleration detecting element 2 at both the sides of the groove 6a in the above-mentioned lengthwise direction.

Therefore, the first and second holding members 5 and 6 support both end portions of the acceleration detecting element 2 in the lengthwise direction. That is to say, the acceleration detecting element 2 is supported from both the sides thereof.

Surfaces of the first holding member 5 that are parallel with the third surface 2c and the fourth surface 2d of the acceleration detecting element 2 correspond to a first holding member surface 5b and a second holding member surface 5c, respectively. That is to say, the first holding member surface 5b and the second holding member surface 5c oppose each other in the thickness direction.

In the same manner, a first holding member surface 6b and a second holding member surface 6c of the second holding member 6 also oppose each other in the above-mentioned thickness direction.

The first and second holding members 5 and 6 are bonded to the acceleration detecting element 2 so as to configure a plate-like structure as illustrated in the drawings. In the plate-like structure, in the embodiment, the third surface 2c of the acceleration detecting element 2 is located at the inner side relative to the first holding member surfaces 5b and 6b in the above-mentioned thickness direction. In the drawings, the third surface 2c of the acceleration detecting element 2 is located at the lower side relative to the first holding member surfaces 5b and 6b of the first and second holding members 5 and 6. The above-mentioned first and second holding members 5 and 6 can be formed by an appropriate insulating material such as insulating ceramics, for example, alumina or synthetic resin.

A first packaging substrate 7 is laminated on the upper surface of the above-mentioned plate-like structure. Further, a second packaging substrate 8 is laminated on the lower surface of the above-mentioned plate-like structure.

The first and second packaging substrates 7 and 8 can be formed by an appropriate rigid insulating material such as insulating ceramics, for example, alumina or synthetic resin.

The above-mentioned first packaging substrate 7 is formed by a flat plate-like member having no recess portion on the lower surface thereof. As described above, the height of the third surface 2c of the acceleration detecting element 2 is lower than those of the first holding member surfaces 5b and 6b as the upper surfaces of the first and second holding members 5 and 6. Accordingly, even when the flat plate-like first packaging substrate 7 is laminated, the space for not inhibiting displacement of the acceleration detecting element can be formed above the acceleration detecting element 2.

It should be noted that a recess portion 8a is formed on the upper surface of the second packaging substrate 8. The recess portion 8a is provided so as to form a space for not inhibiting displacement of the acceleration detecting element 2.

When the above-mentioned first and second packaging substrates 7 and 8 are bonded to the above-mentioned plate-like structure, an appropriate bonding material such as an adhesive can be used. Gaps opening to the outside are generated between the third surface 2c, that is, the upper surface of the acceleration detecting element 2 and the first packaging substrate 7. However, as indicated by an arrow X in FIG. 2, the gaps are also filled with the adhesive so that sealing property of the acceleration detecting device 1 can be enhanced sufficiently.

An appropriate bonding material such as an adhesive can be also used for bonding the acceleration detecting element 2 and the first and second holding members 5 and 6.

In the acceleration detecting device 1 according to the embodiment, the flat plate-like packaging substrate 7 can be used as described above. Accordingly, the thickness of the first packaging substrate 7 can be reduced. This can reduce the height of the acceleration detecting device 1. In addition, the flat plate-like packaging substrate 7 having no recess portion can be used, thereby reducing the cost.

Figure 3:
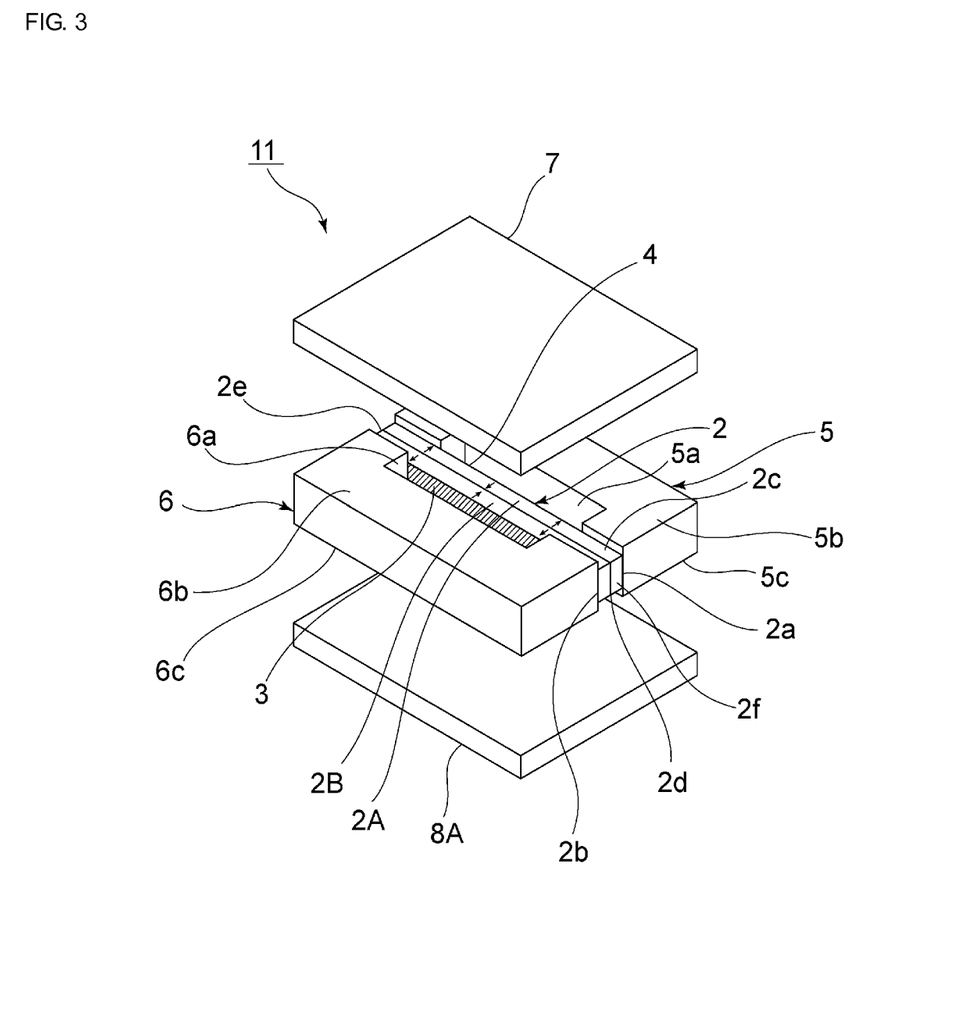
FIG. 3 is an exploded perspective view illustrating an acceleration detecting device according to a second embodiment of the invention.

FIG. 3 is an exploded perspective view illustrating an acceleration detecting device according to a second embodiment of the invention. In an acceleration detecting device 11 in the second embodiment, the fourth surface 2d of the acceleration detecting element 2 is located at the inner side relative to the second holding member surfaces 5c and 6c of the first and second holding members 5 and 6 in the above-mentioned thickness direction. Other configurations thereof are the same as those in the first embodiment, so that the same reference numerals as those in the first embodiment denote the same components and description in the first embodiment is applied thereto.

In the embodiment, the third surface 2c and the fourth surface 2d at both of the upper surface side and the lower surface side of the acceleration detecting element 2, that is, at both of the third surface 2c side and the fourth surface 2d side are located at the inner side relative to the holding member surfaces of the first and second holding members 5 and 6 in the above-mentioned thickness direction. Accordingly, not only the first packaging substrate 7 but also a second packaging substrate 8A is formed by flat plate-like members having no recess portion. Therefore, the height and the cost can be further reduced.

Figure 4:
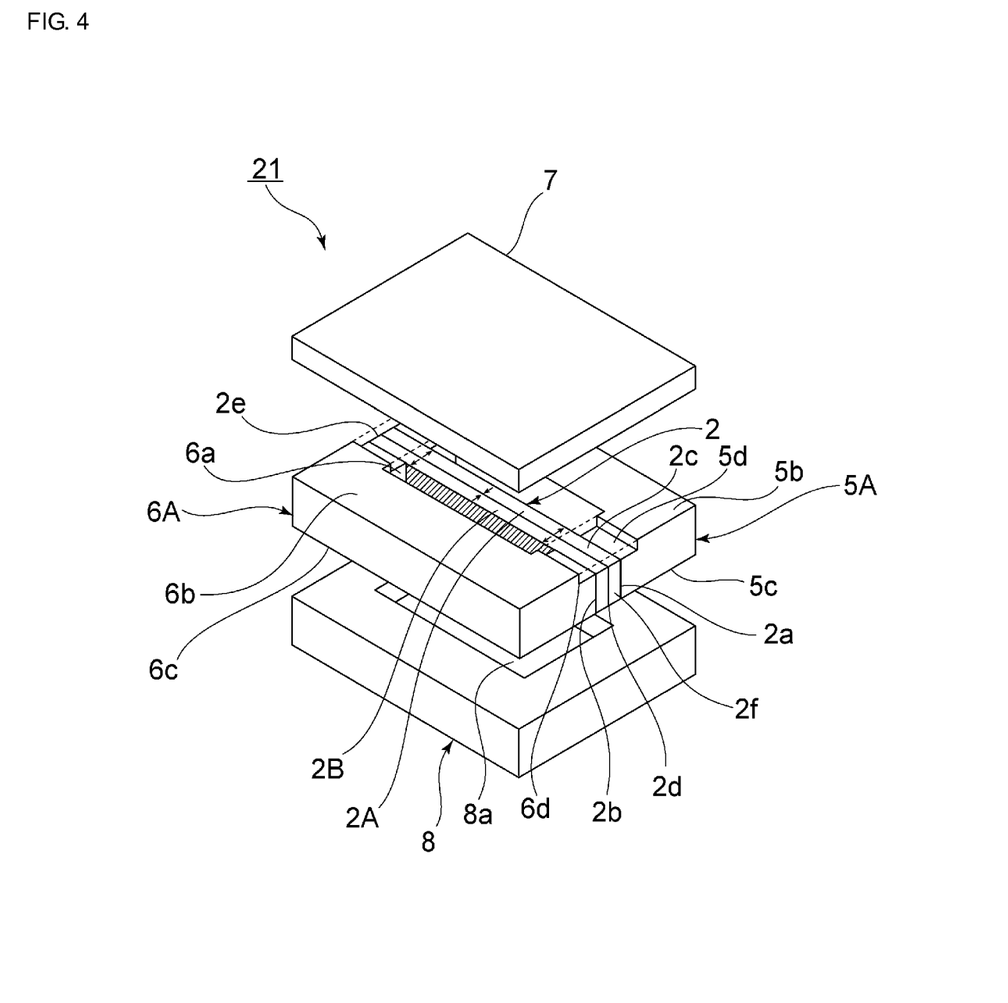
FIG. 4 is an exploded perspective view illustrating an acceleration detecting device according to a third embodiment of the invention.

FIG. 4 is an exploded perspective view illustrating an acceleration detecting device according to a third embodiment of the invention. An acceleration detecting device 21 in the third embodiment has the same configuration as that in the first embodiment other than a point that a first holding member 5A is different from the first holding member in the first embodiment. In the acceleration detecting device 21 in the embodiment, the first holding member 5A has a groove portion 5d. The groove portion 5d is provided at the upper surface side of the first holding member 5A on a portion on which the first holding member 5A holds the acceleration detecting element 2. That is to say, the groove portion 5d is formed so as to have the bottom surface lower than the first holding member surface 5b. The bottom surface of the groove portion 5d is provided so as to be flush with the third surface 2c of the acceleration detecting element 2. Thus, the groove portion 5d having the bottom surface that is flush with the third surface 2c of the acceleration detecting element 2 may be provided so as to be continuous to the third surface 2c in the first holding member 5A.

It should be noted that a similar groove portion 6d is also formed on a second holding member 6A.

In this manner, the groove portions 5d and 6d having the bottom surfaces lower than the first holding member surfaces 5b and 6b as the main surfaces may be formed on the first and second holding members 5A and 6A, respectively. In this case, a larger amount of adhesive is applied to a portion supporting the acceleration detecting element 2. Accordingly, the bonding strength of the first packaging substrate 7 can be enhanced.

Figure 5:
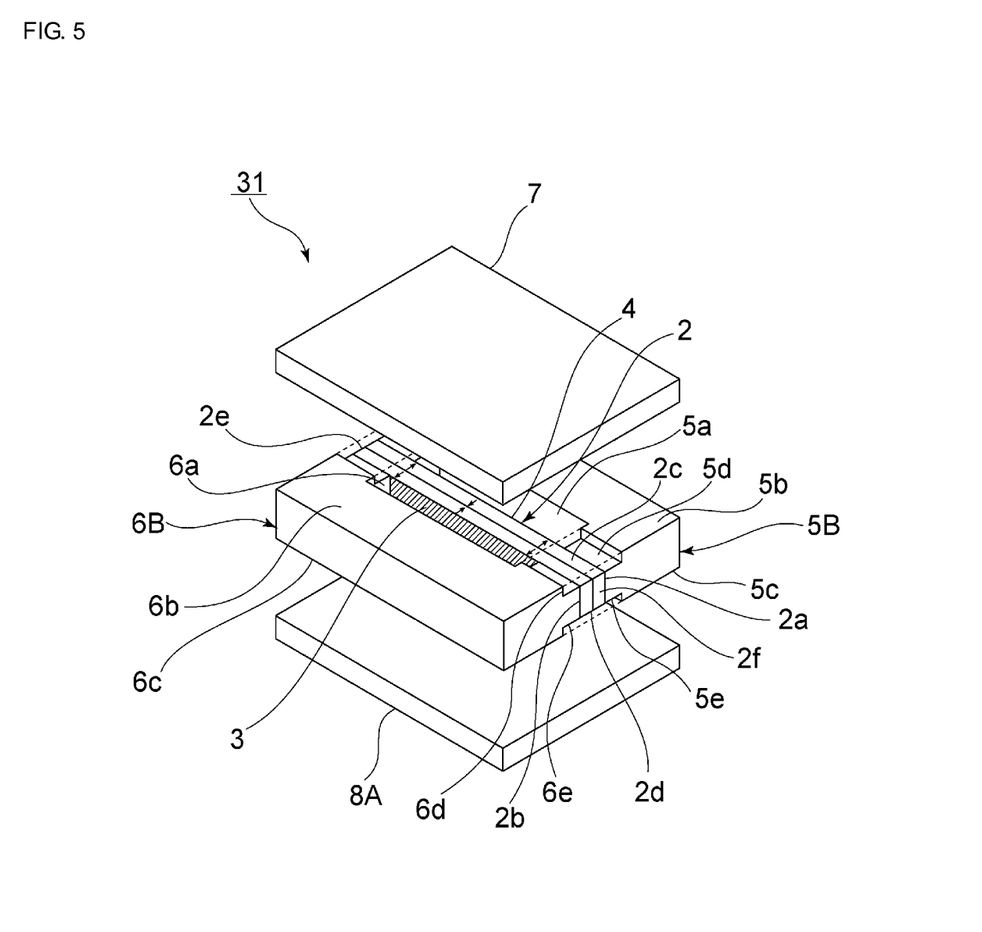
FIG. 5 is an exploded perspective view illustrating an acceleration detecting device according to a fourth embodiment of the invention.

FIG. 5 is an exploded perspective view illustrating an acceleration detecting device according to a fourth embodiment of the invention. An acceleration detecting device 31 in the embodiment corresponds to a modification of the acceleration detecting device 21 in the third embodiment. That is to say, in the embodiment, groove portions 5e and 6e are also provided on first and second holding members 5B and 6B, respectively, at the fourth surface 2d side of the acceleration detecting element 2. The bottom surfaces of the groove portions 5e and 6e are flush with the fourth surface 2d of the acceleration detecting element 2. Accordingly, in the acceleration detecting device 31, the flat plate-like second packaging substrate 8A can be used at the lower surface side. Therefore, reduction in the height and improvement in the bonding strength of the second packaging substrate 8A can be further enhanced.

Figure 6:
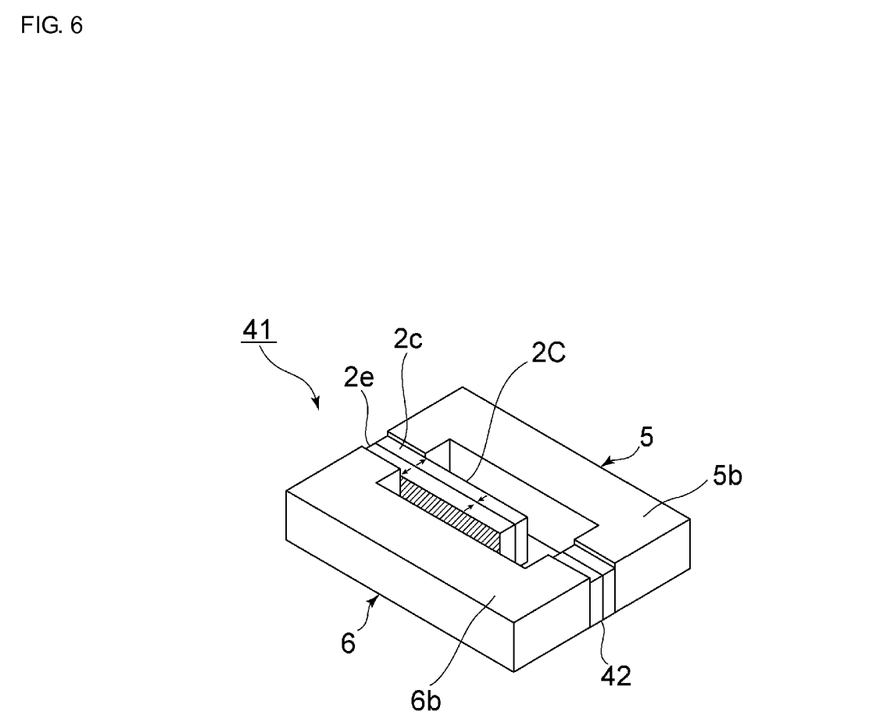
FIG. 6 is a perspective view illustrating outer appearance of an acceleration detecting device according to a fifth embodiment of the invention.

FIG. 6 is a perspective view illustrating outer appearance of an acceleration detecting device according to a fifth embodiment of the invention. In an acceleration detecting device 41 in the embodiment, first and second packaging substrates are not illustrated in FIG. 5. In the embodiment, an acceleration detecting element 2C is supported between the first and second holding members 5 and 6 in a cantilever form. That is to say, the acceleration detecting element 2C is used instead of the acceleration detecting element 2 in the first embodiment. The acceleration detecting element 2C is also a bimorph-type acceleration detecting element. The acceleration detecting element 2C is held and supported by the first and second holding member 5 and 6 therebetween at one end side in the lengthwise direction. The other end of the acceleration detecting element 2C in the lengthwise direction is a free end. Accordingly, the acceleration detecting element 2C is supported in a cantilever form.

In the acceleration detecting device 41, the first holding member 5 and the second holding member 6 hold the acceleration detecting element 2C therebetween at one end side and hold a dummy member 42 therebetween at the other end side. Also in the embodiment, as in the first embodiment, the third surface 2c of the acceleration detecting element 2C is located at the inner side relative to the first holding member surfaces 5b and 6b as the upper surfaces of the first and second holding members 5 and 6 in the above-mentioned thickness direction. Further, the upper surface of the dummy member 42 is also located at the inner side of the first and second holding member surfaces 5b and 6b in the above-mentioned thickness direction. Therefore, in the same manner as the first embodiment, a packing substrate having no recess portion on the lower surface thereof can be used as a first packaging substrate laminated at the upper side. Accordingly, reduction in the height and the cost can be achieved.

Figure 7:
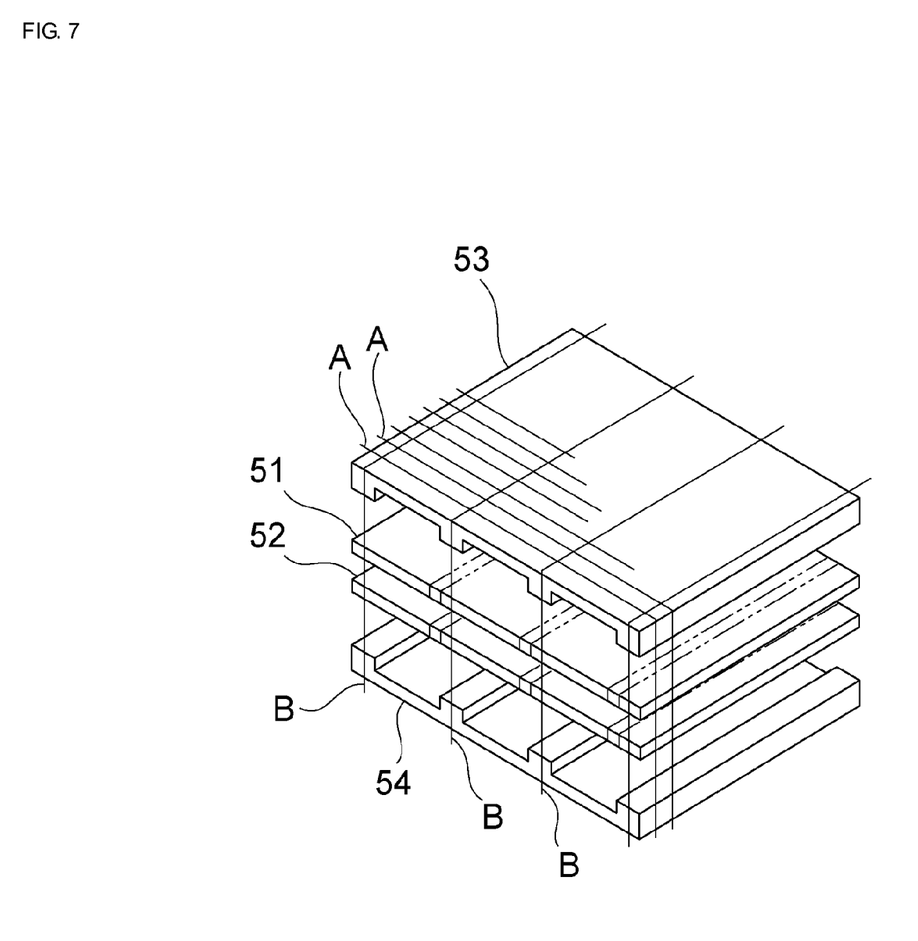
FIG. 7 is a perspective view for explaining an example of a method for manufacturing the acceleration detecting device in the first embodiment.

It should be noted that a method for manufacturing a plate-like structure formed by bonding the above-mentioned acceleration detecting element and first and second holding members can be executed same as the existing method for manufacturing the acceleration detecting element. For example, as illustrated by the perspective view in FIG. 7, mother piezoelectric layers 51 and 52 are laminated and a mother first holding member 53 and a mother second holding member 54 are laminated and bonded to the upper and lower sides of the mother piezoelectric layers 51 and 52. Thereafter, a multilayer body obtained in this manner is cut along thin lines A in FIG. 7. After that, a portion of an acceleration detecting element configured by laminating the mother piezoelectric layers 51 and 52, which corresponds to the third surface 2c of the above-mentioned acceleration detecting element 2, is cut. With this, the third surface can be located at the inner side in the above-mentioned thickness direction in FIG. 1. Then, the multilayer body is further cut along thin lines B as illustrated in FIG. 7. In this manner, the plate-like structure in the acceleration detecting device 1 according to the first embodiment can be obtained.

Although the first and second packaging substrates 7 and 8 are provided in the above-mentioned embodiments, the first and second packaging substrates 7 and 8 may not be provided and be replaced by members at the side at which the acceleration detecting element is mounted. In this case, as in the above-mentioned embodiment, at the side at which the third surface and/or the fourth surface are (is) located at the inner side in the thickness direction, the flat plate-like member can be laminated on the plate-like structure so as to configure an acceleration detecting device.

REFERENCE SIGNS LIST

1 ACCELERATION DETECTING DEVICE
2 ACCELERATION DETECTING ELEMENT
2A FIRST PIEZOELECTRIC LAYER
2B SECOND PIEZOELECTRIC LAYER
2C ACCELERATION DETECTING ELEMENT
2a FIRST SURFACE
2b SECOND SURFACE
2c THIRD SURFACE
2d FOURTH SURFACE
2e FIFTH SURFACE
2f SIXTH SURFACE
3, 4 DETECTION ELECTRODE
5 FIRST HOLDING MEMBER
5A, 5B FIRST HOLDING MEMBER
5a GROOVE
5b, 6b FIRST HOLDING MEMBER SURFACE
5c, 6c SECOND HOLDING MEMBER SURFACE
5d, 6d GROOVE PORTION
5e, 6e GROOVE PORTION
6 SECOND HOLDING MEMBER
6A, 6B SECOND HOLDING MEMBER
6a GROOVE
6b FIRST HOLDING MEMBER SURFACE
6c SECOND HOLDING MEMBER SURFACE
6d GROOVE PORTION
7 FIRST PACKAGING SUBSTRATE
8, 8A SECOND PACKAGING SUBSTRATE
8a RECESS PORTION
11, 21, 31, 41 ACCELERATION DETECTING DEVICE
42 DUMMY MEMBER
51, 52 PIEZOELECTRIC LAYER
53 FIRST HOLDING MEMBER
54 SECOND HOLDING MEMBER

The invention claimed is:

1. An acceleration detecting device comprising:
an acceleration detecting element having:
  first and second surfaces opposing each other and each having first, second, third and fourth edges,
  third and fourth surfaces having a first thickness therebetween and extending orthogonally between the first and second edges of the first and second surfaces, respectively, and
  fifth and sixth surfaces extending orthogonally between the third and fourth edges of the first and second surfaces, respectively;
a first holding member that is affixed to the first surface of the acceleration detecting element and that includes a groove opening to the first surface of the acceleration detecting element; and
a second holding member that is affixed to the second surface of the acceleration detecting element and that includes a groove opening to the second surface of the acceleration detecting element,
wherein the first and second holding members each have a first holding member surface and a second holding member surface, respectively, that are parallel with the third and fourth surfaces of the acceleration detecting element and have a second thickness therebetween,
wherein the first thickness is less than the second thickness,
wherein at least one of the first holding member and the second holding member further comprises a groove portion that is continuous and flush with at least one of the third surface and the fourth surface of the acceleration detecting element, and
wherein a longitudinal direction of the groove portion of the at least one first and second holding members extends in a direction parallel to the at least one third and fourth surfaces of the acceleration detecting element.

2. The acceleration detecting device according to claim 1, wherein at least one of the third and fourth surfaces of the acceleration detecting element is disposed at an inner side relative to the first holding member surface or the second holding member surface of the first and second holding members, respectively.

3. The acceleration detecting device according to claim 2, wherein both of the third surface and the fourth surface of the acceleration detecting element are disposed at the inner side relative to the first holding member surface or the second holding member surface of the first and second holding members, respectively.

4. The acceleration detecting device according to claim 1, wherein the groove portion is disposed at the inner side relative to the first holding member surface or the second holding member surface.

5. The acceleration detecting device according to claim 1, further comprising first and second packaging substrates laminated from sides of the third surface and the fourth surface of the acceleration detecting element of a planar structure formed by the first and second holding members and the acceleration detecting element.

6. The acceleration detecting device according to claim 5, wherein the first or second packaging substrate comprises a planar member having a recess on a surface adjacent to a side of the acceleration detecting element.

7. The acceleration detecting device according to claim 1, wherein the first and second holding members are configured to support the acceleration detecting element in a cantilever form.

8. The acceleration detecting device according to claim 1, the first and second holding members are U-shaped and support the acceleration detecting element between respective arms of the U-shape.

9. The acceleration detecting device according to claim 1, wherein the acceleration detecting element comprises a pair of piezoelectric layers polarized in opposite directions.

10. An acceleration detecting device comprising:
a rectangular acceleration detecting element having:
first and second surfaces that oppose each other,
third and fourth surfaces that oppose each other with a first thickness therebetween and that extend orthogonally between the first and second surfaces, respectively, and
fifth and sixth surfaces that oppose each other and that extend orthogonally between the first and second surfaces and between the third and fourth surfaces, respectively;
a first holding member that is affixed to the first surface of the acceleration detecting element and that includes a groove that opens towards the first surface of the acceleration detecting element; and
a second holding member that is affixed to the second surface of the acceleration detecting element and that includes a groove that opens towards the second surface of the acceleration detecting element,
wherein the first and second holding members each have first and second holding member surfaces that are parallel with the third and fourth surfaces of the acceleration detecting element, respectively, and that have a second thickness therebetween,
wherein the first thickness is less than the second thickness,
wherein at least one of the first holding member and the second holding member further comprises a groove portion that is continuous and flush with at least one of the third and fourth surfaces of the acceleration detecting element, and
wherein a longitudinal direction of the groove portion of the at least one first and second holding members extends in a direction parallel to the at least one third and fourth surfaces of the acceleration detecting element.

11. The acceleration detecting device according to claim 10, wherein at least one of the third and fourth surfaces of the acceleration detecting element is disposed at an inner side relative to the first holding member surface or the second holding member surface of the first and second holding members, respectively.

12. The acceleration detecting device according to claim 11, wherein both of the third surface and the fourth surface of the acceleration detecting element are disposed at the inner side relative to the first holding member surface or the second holding member surface of the first and second holding members, respectively.

13. The acceleration detecting device according to claim 10, wherein the groove portion is disposed at the inner side relative to the first holding member surface or the second holding member surface.

14. The acceleration detecting device according to claim 10, further comprising first and second packaging substrates laminated from sides of the third surface and the fourth surface of the acceleration detecting element of a planar structure formed by the first and second holding members and the acceleration detecting element.

15. The acceleration detecting device according to claim 14, wherein the first or second packaging substrate comprises a planar member having a recess on a surface adjacent to a side of the acceleration detecting element.

16. The acceleration detecting device according to claim 10, wherein the first and second holding members are configured to support the acceleration detecting element in a cantilever form.

17. The acceleration detecting device according to claim 10, the first and second holding members are U-shaped and support the acceleration detecting element between respective arms of the U-shape.

18. The acceleration detecting device according to claim 10, wherein the acceleration detecting element comprises a pair of piezoelectric layers polarized in opposite directions.

* * * * *